United States Patent [19]
Snyder et al.

[11] Patent Number: 5,501,107
[45] Date of Patent: Mar. 26, 1996

[54] TORQUE TOOL

[76] Inventors: Robert F. Snyder, 55 High La., Hamden, Conn. 06517; Edward J. Porydzy, 201 Marion Ave., Plantsville, Conn. 06479

[21] Appl. No.: 22,378

[22] Filed: Feb. 23, 1993

[51] Int. Cl.$^6$ ........................................ G01L 5/24
[52] U.S. Cl. ........................................ 73/862.23
[58] Field of Search ............... 73/862.21, 862.23, 73/862.321, 862.325, 862.338; 81/467, 472, 478

[56] References Cited

U.S. PATENT DOCUMENTS

| | | | |
|---|---|---|---|
| 493,273 | 3/1893 | Killinger | 81/62 |
| 861,524 | 7/1907 | Lalonde | 81/58.2 |
| 2,099,601 | 11/1937 | Fields | 81/58.2 |
| 2,376,575 | 5/1945 | Cronan | 192/43.2 |
| 2,536,172 | 1/1951 | Halperin | 81/63.2 |
| 2,639,637 | 5/1953 | Stirzel | 73/861.21 |
| 2,758,493 | 8/1956 | Goldwater | 81/58.2 |
| 2,787,180 | 4/1957 | Fish | 81/57.29 |
| 2,863,347 | 12/1958 | Nelson | 81/467 |
| 2,924,134 | 2/1960 | Harmes | 81/467 |
| 3,165,014 | 1/1965 | Grabovac | 81/483 |
| 3,448,641 | 6/1969 | Morrow | 81/58.2 |
| 3,535,960 | 10/1970 | Borries | 81/57.14 |
| 3,564,955 | 2/1971 | Batchelder | 81/57.29 |
| 3,683,686 | 8/1972 | Sergan | 73/862.21 |
| 3,745,858 | 7/1973 | Biach | 81/57.39 |
| 3,979,977 | 9/1976 | Dorma | 81/57.13 |
| 4,055,080 | 10/1977 | Farr et al. | 73/862.21 |
| 4,359,906 | 11/1982 | Cordey | 73/862.23 |
| 4,418,590 | 12/1983 | Dubiel et al. | 81/467 |
| 4,544,039 | 10/1985 | Crane | 173/182 |
| 4,549,438 | 10/1985 | Grabovac et al. | 73/862.21 |
| 4,562,757 | 1/1986 | Furey | 81/63 |
| 4,665,756 | 5/1987 | Snyder | 73/862.21 |
| 4,773,289 | 9/1988 | Graffin | 81/472 |
| 4,928,558 | 5/1990 | Makhlouf | 81/57.3 |
| 4,976,159 | 12/1990 | Snyder et al. | 73/862.21 |

OTHER PUBLICATIONS

David Wilson, Design News, Aug. 3, 1992, Cahners Publishing Company.

Primary Examiner—Richard Chilcot
Assistant Examiner—Elizabeth L. Dougherty
Attorney, Agent, or Firm—Fishman, Dionne & Cantor

[57] ABSTRACT

A torque tool for tightening a nut or fastener of a work piece to a pre-determined torque level is presented. The torque tool includes a split housing having mounted therein a gear train for driving a hinged gear, a releasably mounted reaction tool and an electronic circuit for indicating an amount of torque placed upon the fastener. A power input is, planar with and interconnected to the gear train. The gear train includes a worm and a worm gear. The hinged gear meshes with the worm gear and includes a socket for engaging the fastener. The reaction tool has an open end or jaw for receiving a portion of the work piece and an opposite end which, when mounted, is disposed within a tubular recess of the housing. This structure provides for the retention of reaction forces within the housing of the torque tool itself. The electronic circuit for indicating torque is employed to measure the reaction forces via a strain gauge and display such forces to an operator of the tool.

43 Claims, 4 Drawing Sheets

TORQUE TOOL

BACKGROUND OF THE INVENTION

This invention relates generally to the field of torquing tools and, more particularly, to power or manually driven torque wrenches capable of measuring an amount of torque placed on a fastener.

Wrenches for placing a torque on a bolt or the like which are hand operated or power operated and include means for monitoring the torque are well known. Several U.S. patents describe such wrenches, for example, U.S. Pat. No. 3,683,686 to Sergan, U.S. Pat. No. 3,745,858 to Biach and U.S. Pat. No. 4,665,756 to Snyder all of which are assigned to Raymond Engineering, the assignee hereof.

Torque wrenches which utilize electronic strain gauges are disclosed in various patents including U.S. Pat. No. 4,549,438 to Grabovac et al. This patent discloses a torque wrench having dual reaction arms and strain gauges mounted thereon. When the wrench is operated, the strain gauges output a signal to a bridge circuit and comparator which, in turn, provides output for a digital readout. Also, U.S. Pat. No. 4,876,159 to Snyder et al., also assigned to Raymond Engineering, discloses a dual mode torque wrench for torquing fasteners. This wrench discloses a single reaction arm whereon strain gauges are mounted for providing input to a circuit for displaying torque applied to a fastener. While all of the above-described devices may be used for torquing a fastener, all of these devices pose a problem with respect to use in confined spaces and around conduits, particularly flexible or rigid conduit which are joined together with fittings.

Torquing devices used for simply tightening bolts in confined spaces and disposed on conduit are well known. U.S. Pat. No. 4,562,757 discloses a ratchet wrench which includes a hinged socket. U.S. Pat. No. 3,535,960 shows a power driven tubing wrench having slots for use on tubing. U.S. Pat. No. 4,562,757 to Furey discloses a ratchet wrench having a hinged socket and teeth for engaging a ratchet and thereby moving the socket for tightening or loosening. U.S. Pat. No. 4,928,558 to Makhlouf provides a torque wrench which has a gear train for torque multiplying and an outwardly extending reaction arm which engages a fixed object such as a pipe for preventing rotation of the device while torquing a bolt.

However, none of the above discussed patents disclose a device which provides a means for measuring the torque placed on a fastener. In addition, there continues to be a need for improved, economical torquing devices for tightening fasteners in confined spaces, particularly nuts disposed on conduit such as flexible or rigid tubing.

SUMMARY OF THE INVENTION

The above-discussed and other drawbacks and deficiencies of the prior art are overcome or alleviated by the torque tool of the present invention. In accordance with the torque tool of the present invention, a reaction tool is releasably mounted to one half of a split housing. A torque multiplying gear train which terminates in a hinged gear is mounted within the housing along with a torque measuring circuit. The reaction tool may be in the shape of an open end wrench and is slidably mounted within a tubular recess of the housing.

The torque measuring circuit includes a strain gauge measuring device which is mounted adjacent the tubular recess and is provided for monitoring the strain of the housing which occurs during the torquing of a bolt. The torque measuring circuit receives input from the strain gauge and combination analog to digital converter and electronic display is provided for indicating torque level to the operator.

As mentioned, the torque multiplying gear train and hinged gear are mounted within a split housing. The gear train includes a power input, a worm, a worm gear and a hinged gear. The power input is integrally connected with the worm which is rotatably mounted on an eccentric access for movement into and out of engagement with the worm gear. The hinged gear is mounted at one end of the housing and engages a pair of arcuate ridges on the latter. The hinged gear also includes a socket for engaging a fastener and the hinge feature allows the torque tool to be particularly useful for torquing fasteners disposed on conduit such as flexible or rigid tubing.

Another feature of the present invention is the planar configuration of the torque multiplying gear train which allows the housing to be thin in cross-section for use in areas with limited space.

Yet another feature of the present invention is the releasable nature of the reaction tool. This provides for the added feature of the interchangeability of reaction tools whereby different size and shaped reaction tools may be utilized for engaging a work piece.

Still yet another feature of the present invention is the hinged gear and socket configuration which allows for the torquing of conduit fasteners.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several figures.

DESCRIPTION OF THE PREFERRED EMBODIMENT

Figure 8:
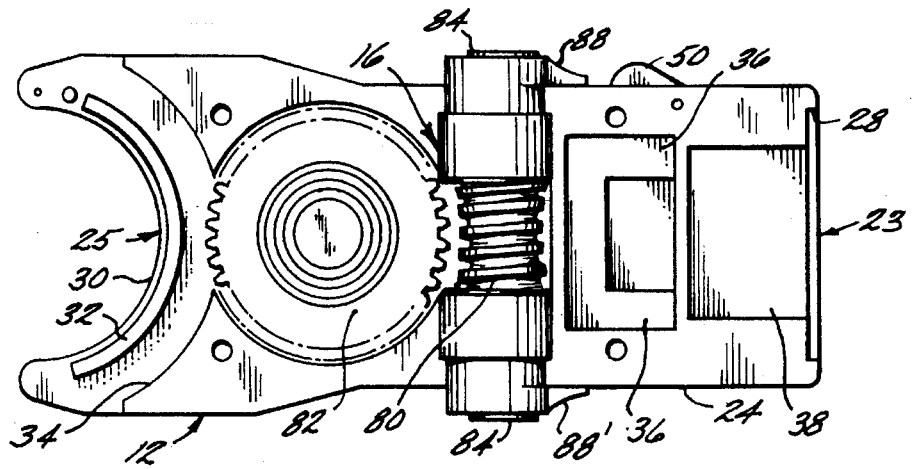
FIG. 8 is a plan view of the device of FIG. 1 showing the lower half of the housing with the worm disengaged from the worm gear and the hinged gear removed.
Figure 6:
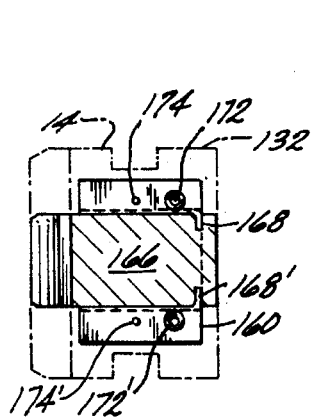
FIG. 6 is a sectional view taken along the lines 6—6 of FIG. 5.
Figure 5:
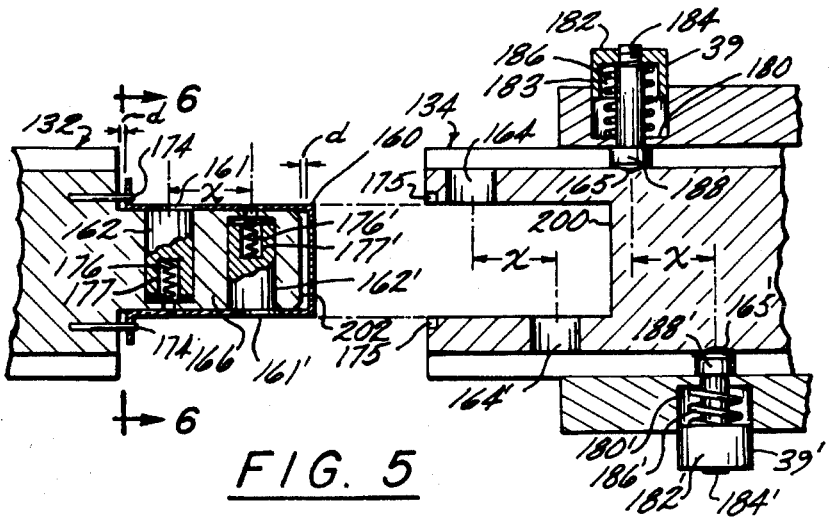
FIG. 5 is the enlarged sectional view of FIG. 4 with the hinged gear in the open position.

Referring first to FIGS. 1, 2, 3 and 8, depicted generally at 10 is a torque tool in accordance with the present invention. Torque tool 10 includes a housing 12, a hinged gear 14, a gear train 16, a reaction tool 18 and a torque measuring circuit 20. The housing 12 may be formed of any suitably strong and durable material such as steel and includes an upper half 22 and a lower half 24 which may be fastened together by such suitable means as screws 26. As best shown in FIG. 8, the housing 12 includes a rear end 23 and a front end 25. The rear end 23 of the housing 12 includes a shallow rectangular inset portion 28 for receiving a digital display which will be more fully described hereinafter and the front end 25 is formed to receive the hinged gear 14. The front end 25 also includes a curved portion 30 which is shaped to match the general curvature of the hinged gear 14 and thereby provides maximum access thereto. An arcuate ridge or tongue 32 is provided for retaining the hinged gear 14 and flange 34 is provided as a recess for the hinged gear. The rectangular portion 28, curved portion 30, tongue 32 and flange 34 are depicted as disposed on the lower half 24 although, it will be understood that they are also provided on the upper half 22 of the housing 12. Lower half 24 also includes a receptacle 36 for a battery and a receptacle 38 for the torque measuring circuit 20. A pair of release pins 39 and 39' are also provided and function to lock and unlock the hinged gear 14 which will be more fully described hereinafter.

Figure 2:
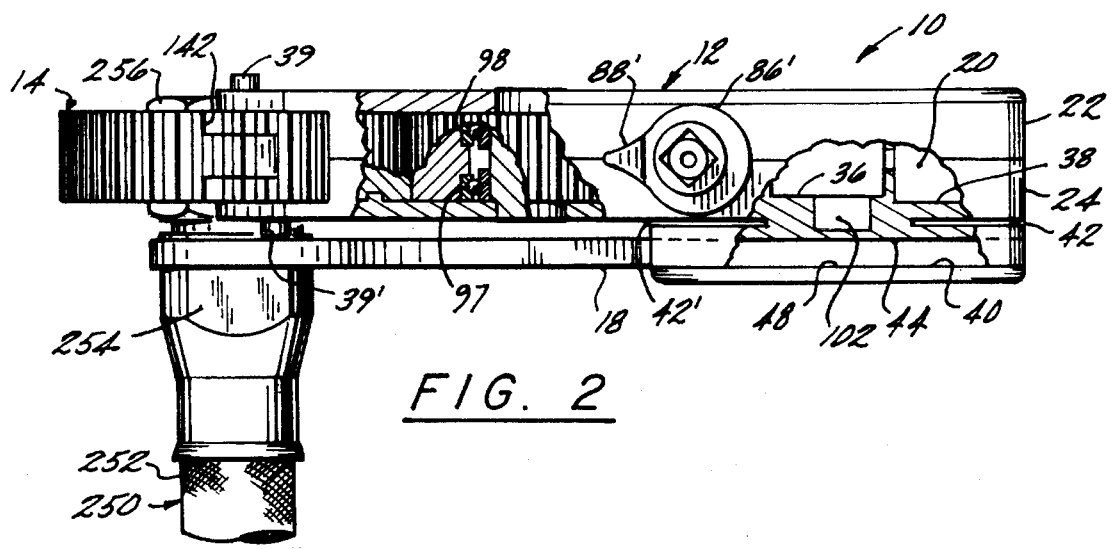
FIG. 2 is a side view, with the housing the hinged gear and the worm gear partially cut away, of the device of FIG. 1.
Figure 3:
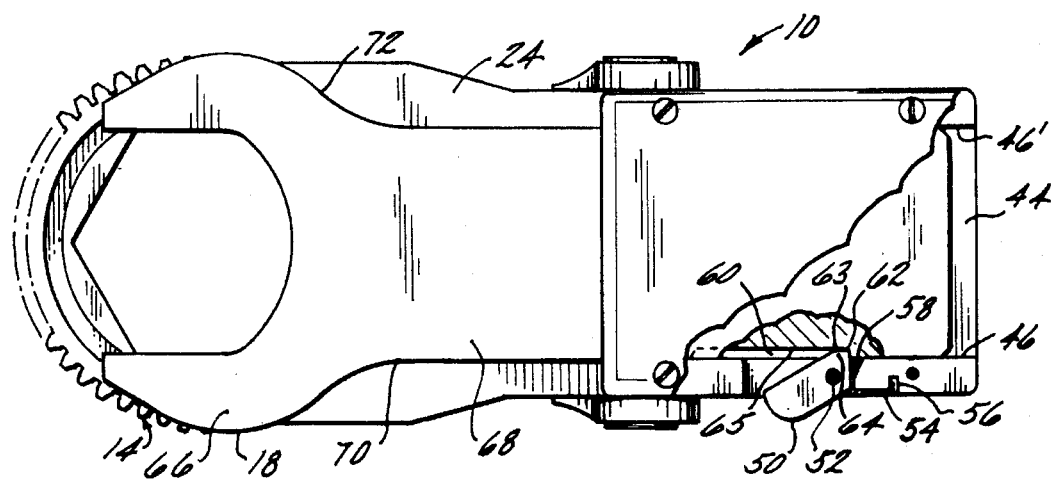
FIG. 3 is a bottom view with a tubular recess partially cut away showing the reaction tool which is also partially cut away and the release mechanism of the device of FIG. 1.

As best shown in FIGS. 2 and 3, tubular recess 40 is provided for receiving the reaction tool 18 and is generally delineated by slots 42 and 42'. These slots, 42 and 42', are provided for increasing the amount of strain felt at a junction between the tubular recess 40 and the housing 12 which will be more fully described hereinafter. An inner surface 44, shoulders 46 and 46' and cover 48 define an opening wherein the reaction tool 18 is disposed. A lever 50 is provided for releasably engaging the reaction tool 18 and same rotates about a pin 52. Spring 54 is mounted within a generally L-shaped receptacle 56 and a V-shaped cut 58 is made in the shoulder 46 for receiving a portion of the spring 54 when the lever 50 is moved inwardly. The reaction tool 18 has an elongated slot 60 which is provided for allowing the reaction tool 18 to slide inwardly or outwardly the length of the sculpted portion 60 for the convenience of the operator in manipulating the reaction tool 18 for engaging the work piece. The slot 60 terminates in a shoulder 62 which, when the reaction tool 18 is fully extended, engages the rear portion or toe 64 of the lever 50 when the former is mounted to the torque tool 10. Toe 64 has a taper 63 which is provided for engaging a surface 65 of the slot 60. For disengaging the reaction tool 18, the lever 50 is urged inwardly thereby rotating the toe 64 away from sculpted portion 60 and the surface 62.

Reaction tool 18 may be formed of any suitably strong material and includes a wrench head 66 and a handle portion 68. The wrench head 66 is depicted having a generally C-shape for engaging opposing flat surfaces of a work piece, although, it will be understood that any suitable shape for engaging a work surface of a conduit fitting or the like may be employed. The handle portion 68 includes the above-described slot 60 which may be mirrored along opposing edges 70 and 72 so that the reaction tool 18 may be quickly and easily inserted into the tubular recess 40.

Figure 1:
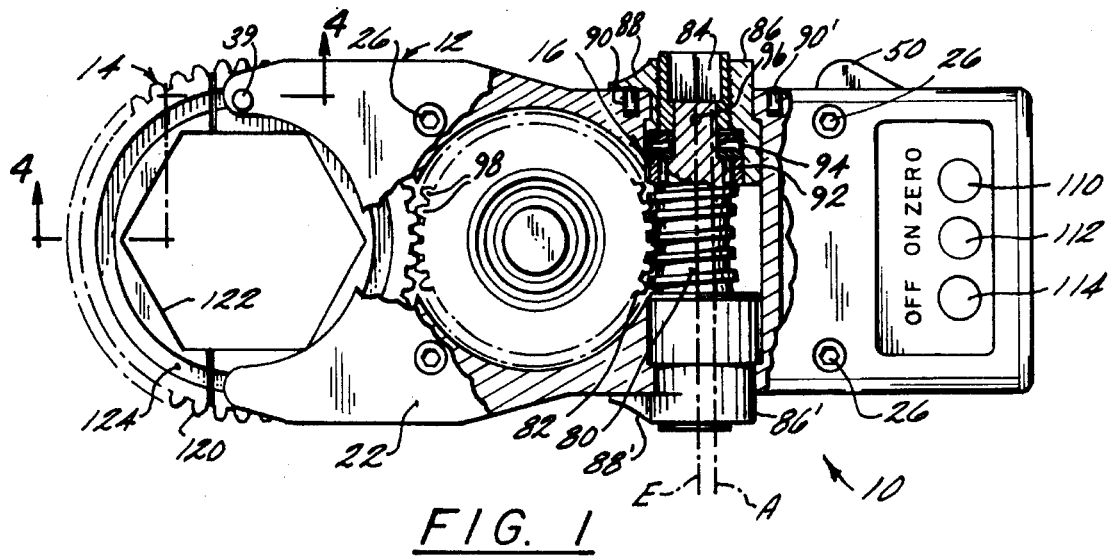
FIG. 1 is a top view of an upper half of a housing partially cut away showing a worm, which is also partially cut away showing a power input, meshed with a worm gear of the torque tool and a hinged gear engaging a work piece in accordance with the present invention.

Gear train 16 comprises a worm 80 and a worm gear 82. A power input socket 84 extends outwardly of the housing 12 and is depicted as integrally connected to the worm 80. However, it will be understood that these may be separate components. The worm 80 and input socket 84 may be formed of any suitably strong material such as a tempered steel and are rotatably mounted within worm housings 86 and 86' on a longitudinal axis E which is eccentric to a central axis A of the worm housings 86 and 86' and is provided for engaging and disengaging the worm 80 from the worm gear 82 as shown in FIGS. 1 and 8, respectively. The engaging and disengaging feature is advantageous to the operator who can, when the worm is disengaged, rotate the torque tool 10 for properly engaging a work piece which will be more fully described hereinafter. Worm housings 86 and 86' include pointers 88 and 88' which provide an indication to the operator of whether the worm 80 is engaged with the worm gear 82. Worm housing detents 90 and 90' may be provided on either side of worm housings 86 and 86' and function to engage depressions of pointers 88 and 88' for "snapping" the worm 80 into position. The worm 80 and power input 84 rotate within worm housings 86 and 86' by means of needle bearings 92 and thrust bearings 94. A shear pin 96 is included for preventing damage to the gear train 16 or hinged gear 14 when an overloading of the tolerance of the gears occurs. It will be understood that shims and spacers will also be provided within the worm housings 86 and 86' as is necessary.

The gear train 16 and hinged gear 14 all fall within the same general plane and, in order to accomplish this, it will be understood that the worm 80 may be of the hourglass-type of enveloping worm which can drive standard involute spur gear teeth of worm gear 82 which is for example shown in "Analytical Mechanics of Gears" by Earle Buckingham pp. 69–78, published by Constable and Company, Limited, (1949) which is incorporated herein by reference. Because of the structure of the worm gear 82, the same may drive a straight toothed hinged gear 14 thus providing the planar relationship therebetween. The worm gear 82 may be mounted on any suitable spindle (not shown) and includes a set of bearings 97 and teeth 98.

Figure 9:
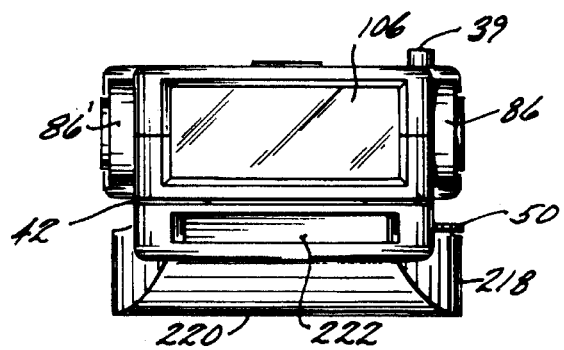
FIG. 9 is a rear view of the device of FIG. 1.
Figure 12:
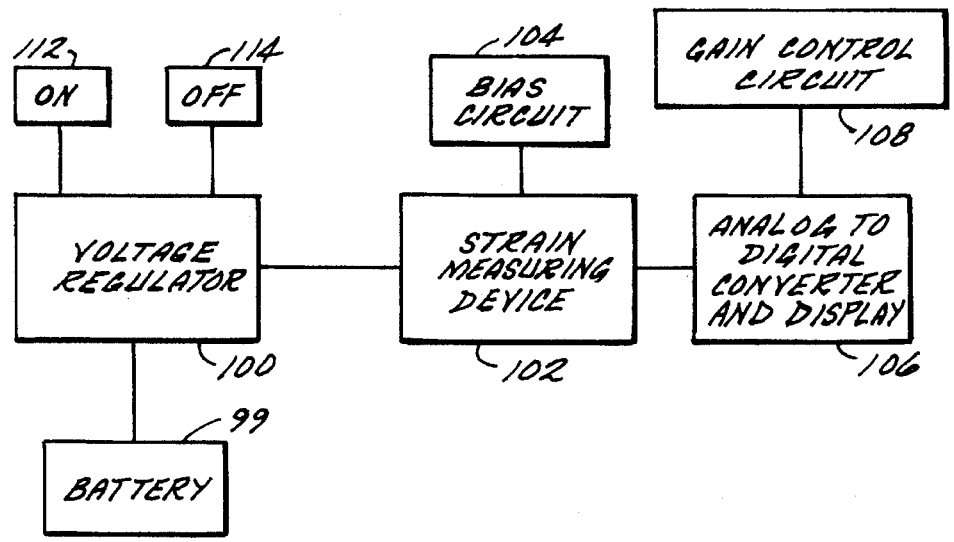
FIG. 12 is a block diagram of the torque measuring circuit according to the present invention.

Referring now also to FIGS. 9 and 12 the torque measuring circuit 20 comprises a power source 99 connected to a voltage regulator 100, a strain measuring device 102, an analog to digital converter and digital display 106 and a gain control circuit 108. The display 106 may be of the LED type, for example, such as that manufactured by Datel, model No. DMH-30PC. The strain measuring device 102 may be of the film or foil type which functions as a bridge circuit whereby the resistance of the bridge circuit will change in direct proportion to the amount of shear force placed upon the torque tool 10 which will be more fully described hereinafter. It will be appreciated that separate analog digital connector and digital display may be utilized although it is depicted here as one integral unit. The strain measuring device 102 is mounted, as shown in FIG. 2, at a point which is generally planar with slots 42 and also centrally located between slots 42. This position is advantageous in that when the torque tool 10 is operated, reaction forces will be translated through the reaction tool 18 and a moment will be felt at that specific point where the strain measuring device is mounted creating a shearing force in the material which will be monitored by the strain gauge. It will be understood that the bias circuit 104 is provided for zeroing the display which will occasionally be necessary during use to counteract the effects of, for example, hysteresis phenomena occurring in the strain measuring device 102. The gain control circuit 108 is provided for converting the voltage change from the bridge circuit into torque. Voltage regulator 100 is connected with switches 112 and 114 for turning "on" and "off" respectively, the torque measuring circuit 20.

Figure 4:
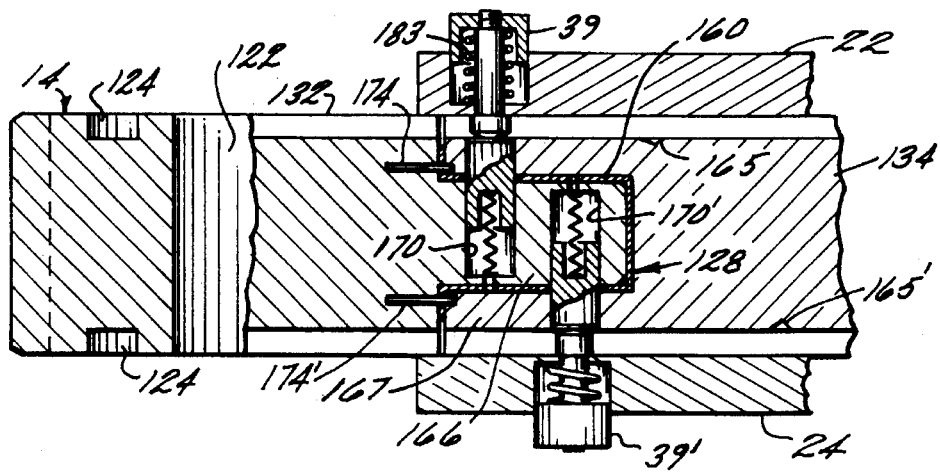
FIG. 4 is an enlarged sectional view taken along lines 4—4 of FIG. 1 showing the hinged gear in the closed position.

Referring to FIGS. 1–7, the hinged gear 14 may be formed of any suitably strong material such as a tempered steel and includes straight outer teeth 120, a central output socket 122, a pair of grooves 124, a hinge 126 and locking means 128 (FIG. 4). The teeth 98 of the worm gear 82 engage the teeth 120 for driving the hinged gear 14. The output socket 122 is provided for engaging a bolt of a work piece (not shown) and may be shaped to receive a hexagonal nut or bolt as illustrated. However, it will be understood that any suitable shape of the socket may be employed which is within the scope of this invention. The pair of grooves 124 are disposed on opposing edges of the hinged gear 14 and are employed for mating with the ridges 32 of the housing 12 for mounting and retaining purposes.

Figure 7:
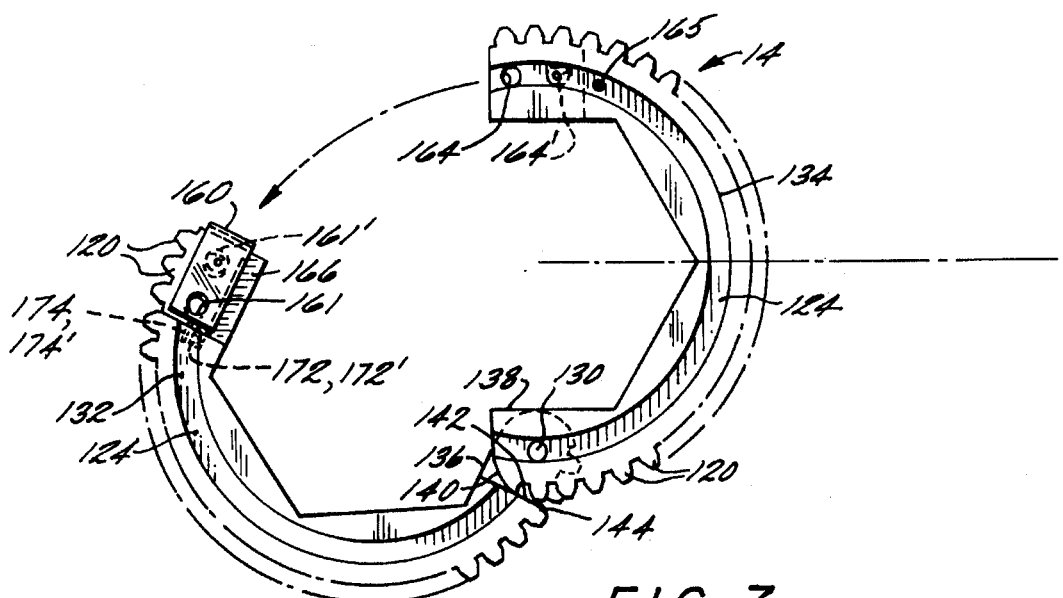
FIG. 7 is a top view of the hinged gear in accordance with the present invention.

A hinge pin 130 is provided for rotatably interconnecting two halves a male half 132 and a female half 134 of the hinged gear 14. The male half 132 includes a first male end 136 which is connected by the hinge pin 130 to a first female end 138 of the female half 134. The female end 138 includes a taper 140 which allows male half 132 to rotate about the hinge pin 130. This taper is configured so as to eliminate a tooth 120 so that a pair of shoulders 142 and 142' of the male end 136 may pass the taper 140 when the hinged gear 14 is open, as best shown in FIG. 7. Tooth 144 is provided on the first male end 136 for engagement with the worm gear 80.

Locking means 128 (FIG. 4) is provided for locking the two halves 132 and 134 of the hinged gear 14 together and comprises a slide 160, a pair of pistons 162 and 162' and a pair of apertures 164 and 164'. Slide 160 is generally thin in cross section and may be formed of any suitably strong material such as brass. The slide 160 is fit over a second male end 166 of the male half 132 of the hinged gear 14. Flanges 168 and 168' extend inwardly into recesses of the second male end 166 which are held in place by fasteners (not shown). Recesses are larger in a longitudinal dimension so as to allow the slide 160 to move a distance "d" for retaining pistons 162 and 162' within their respective cavities 170 and 170'. The slide is urged forwardly by two springs 172 and 172' and a pair of guide pins 174 and 174' which protrude through apertures 161 and 161' in the slide 160. A pair of clearance recesses 175 and 175' are provided for receiving the guide pins 174 and 174' therein when the two halves 132 and 134 are locked together.

Pistons 162 and 162' are laterally displaced along a dimension "x" of the second male end 166 which corresponds to the lateral distance between the apertures 164 and 164'. A pair of springs 176 and 176' are disposed, at one end, within tubular recesses 177 and 177' of the pistons 162 and 162' and function to urge the pistons outwardly. The other end of springs 176 and 176' are disposed within coninical bores (not numbered) for retaining the springs within the cavities 170 and 170'.

Apertures 164 and 164' and recesses 175 and 175' are disposed within a second female end 167 of the female half 134 of the hinged gear 14. Apertures 164 and 164' extend, at a diameter which is approximately equal to that of the cavities 170 and 170', through the second female end 167.

Release pins 39 and 39' are mounted within tubular receptacles 180 and 180' of the housing 12 and function to engage and force the pistons 162 and 162' into their respective cavities 170 and 170'. The release pins 39 and 39' comprise actuators 182 and 182', rods 184 and 184', springs 186 and 186' and heads 188 and 188'. Springs 186 and 186' are provided for urging the actuators 182 and 182' outwardly and are disposed within tubular recesses 183 and 183' of the actuators. Rods 184 and 184' extend from the central inner portion of the actuators 182 and 182' and terminate in heads 188 and 188' which are larger in diameter than the former for mounting and securing purposes to the housing 12. Heads 188 and 188' are rounded so that when same engage the pistons 162 and 162' and move the latter into the cavities 170 and 170', the slide 160 may move outwardly without engaging the heads.

The operation of locking and unlocking of the hinged gear 14 will now be described. As shown in FIG. 4, the second male end 166 and the second female end 167 are locked together and the hinged gear 14 is positioned so that the release pins 39 and 39' are in axial alignment with the pistons 162 and 162'. To unlock the hinged gear 14, the release pins 39 and 39' are depressed which thereby forces heads 188 and 188' against pistons 162 and 162'. Pistons 162 and 162' are thus forced into cavities 170 and 170' and, once they pass through apertures 161 and 161' of the slide 160, the slide 160 is moved outwardly by springs 172 and 172'. Apertures 161 and 161' thus move and function to cover and thereby retain the pistons 162 and 162' within the cavities 170 and 171'. To relock the hinged gear 14, the female half 134 of the hinged gear is rotated until it is in such a position where the heads 188 and 188' of release pins 39 and 39' may engage a pair of dimples 165 and 165' for holding that half in place. The second male end 166 of the male half 132 is then inserted into the second female end 167 until an outer surface 200 of the second female end engages and moves the slide 160 against an outer surface 202 of the second male end 166. When this occurs, apertures 161 and 161' of the slide 160 are disposed in such a position so as to allow the pistons 162 and 162' to move outwardly and into recesses 164 and 164' thereby locking the male half 132 and the female half 134 together.

Figure 10:
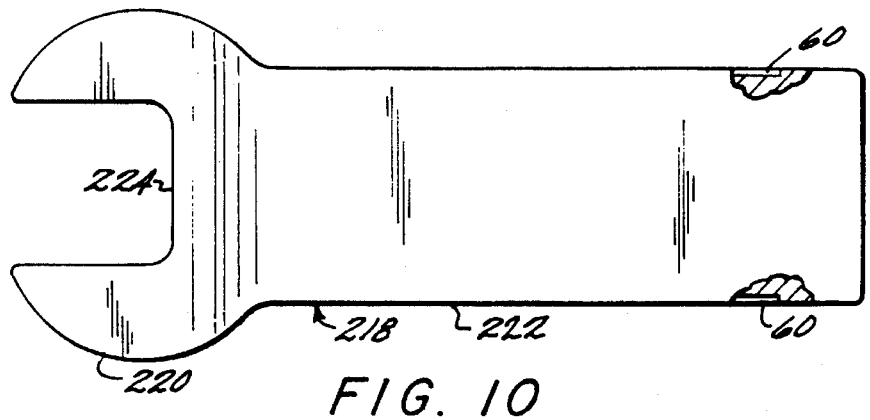
FIG. 10 is a top view of an alternate embodiment of the reaction tool in accordance with the present invention.
Figure 11:
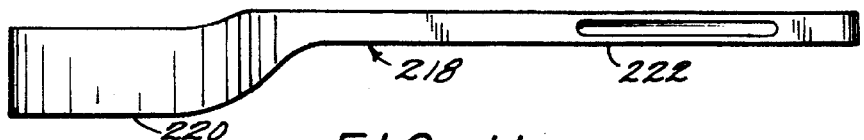
FIG. 11 is a side view of the device of FIG. 10.

Referring to FIGS. 10 and 11, an alternate embodiment of the reaction tool 18 of the present invention is depicted generally at 218 and includes a head 220 and handle portion 222. Handle portion 222 is generally of the same shape as reaction tool 18 so as to mate with the tubular recess 40 of the housing 12. It will be understood that the head 220 is thicker in cross section than the head 66 of the reaction tool 18 for engaging a wider fastener surface. It will also be understood that the configuration of the open end 224 may be varied based upon the configuration which the reaction tool 218 is used to engage during its operation.

The operation of the torque tool for torquing a bolt disposed on a work piece comprising a conduit which has a jacket having flat surfaces and a fastener will now be described. The torque tool 10 may have a suitable power coupling connected to the power input 84 for imparting a rotary force to the worm 80. The hinged gear 14 may be unlocked, as described above, and with the worm 80 out of engagement with the worm gear 82, as also described above, and opened a sufficient amount to receive the conduit within the socket 122. Once the conduit is within the socket, the hinged gear 14 is then relocked. Next, the torque tool 10 is moved along the conduit until the socket 122 is fitted around the fastener. To facilitate this activity, the hinged gear 14 may be rotated by hand since the worm 80 is disengaged. A wrench 10 mounted in this way on a flexible or rigid conduit fitting 250 (such as a Dynatube fitting from Risistoflex Company of Jacksonville, Fla.) is shown in FIG. 2. In FIG. 2, flexible conduit fitting 250 includes a flexible conduit 252, a jacket having flattened surfaces 254 and a fastener 256.

Figure 13:
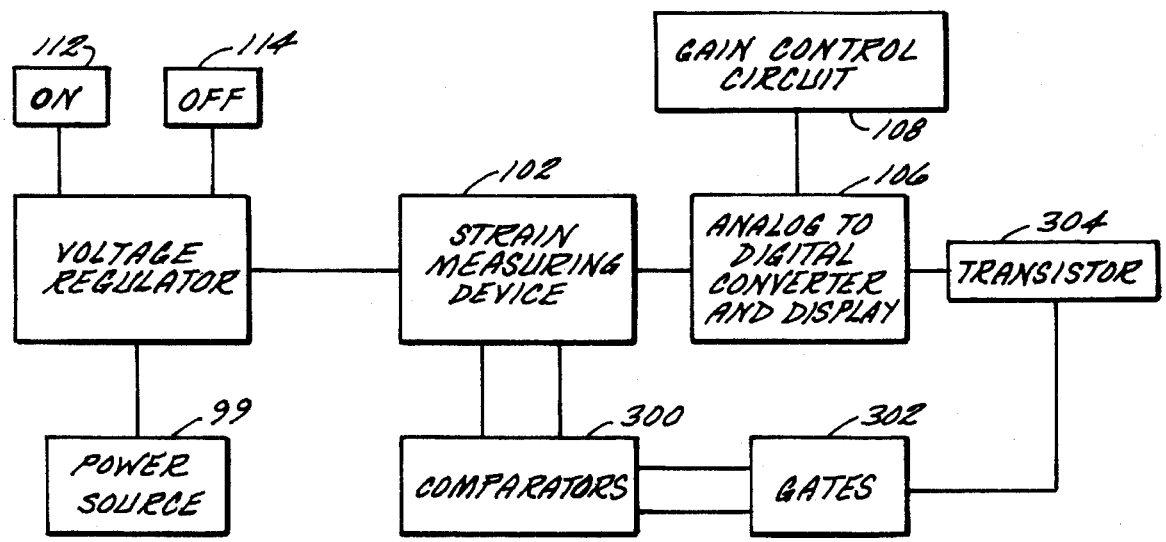
FIG. 13 is a block diagram of an alternate embodiment of the torque measuring circuit according to the present invention.

Referring to FIG. 13, an alternate embodiment of the torque measuring circuit 20 is illustrated for reducing current drain on the power source. The display is only turned on in response to torque thereby reducing the drain on the power source which may be a battery or the like. The torque measuring circuit 20 may be generally the same as that described hereinbefore further including a pair of threshold comparators 300, a pair of gates 302 and a switch or transistor 304 which, when closed energizes the light emmitting diodes of the display 106. Each of the comparators 300 are connected to the strain measuring device 102 and each respond to a strain on respective sides of the bridge circuit or strain measuring device 102. Gates 302 are provided for gating the signal received from the Comparators 300 and facilitating the "turning on" of the display via the transistor 304.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A torque tool comprising:

main housing means;

gear train means mounted in said main housing means, said gear train means having at least one input means;

reaction means mounted to said main housing means; and a hinged gear mounted to said main housing means and engaging said gear train means, said hinged gear having a hinge means wherein said hinged gear pivots about said hinge means into an open position, said hinged gear also having a locking means to maintain said hinged gear in a closed position, said hinged gear including an output means; and a torque measuring means mounted to said main housing means, said torque measuring means including an electronic strain measuring device mounted to said main housing means in a position on said main housing means about which a moment occurs when a force is applied by said hinged gear;

an analog to digital converter adapted to receive an analog signal from said electronic strain measuring device and provide a corresponding digital signal; and a digital display connected in circuit with said analog to digital converter.

2. The device of claim 1 wherein said main housing means includes:

a mounting means for attaching said reaction means, mounting means and said main housing means defining at least one first slot therebetween, said slot employed for increasing shear stress from said reaction means at a point on said housing.

3. The device of claim 2 wherein said at least one first slot includes:

a pair of first slots wherein said moment occurs therebetween.

4. The device of claim 1 including:

a bias circuit connected in circuit with said strain measuring device; and a gain control circuit connected in circuit with said electronic strain measuring device.

5. The device of claim 1 wherein said gear train means includes:

a first gear means terminating at said input means, said first gear means being rotatably supported on first bearing means;

a second gear means which meshes with and is driven by said first gear means, said second gear means being connected to said hinged gear wherein said second gear means drives said hinged gear.

6. The device of claim 5 wherein said gear train means further includes:

at least one gear housing disposed at one end of said first gear means and concentric with said input means.

7. The device of claim 6 wherein:

said at least one input means includes two oppositely disposed input means communicating with said first gear means; and said gear housing means includes two gear housings disposed at opposite ends of said first gear means.

8. The device of claim 7 wherein:

said first gear means is integrally mounted to each of said oppositely disposed input means.

9. The device of claim 8 wherein:

said gear housing means includes a first longitudinal axis;

said first gear means and said input means includes a second longitudinal axis;

10. The device of claim 9 wherein:

said second longitudinal axis is offset or eccentric with respect to said first longitudinal axis.

11. The device of claim 10 wherein:

said first gear means comprises a worm; and said second gear means comprises a worm gear.

12. The device of claim 11 wherein:

said gear housing means is rotatably mounted within said main housing means for engaging and disengaging said worm from said worm gear.

13. The device of claim 12 wherein said gear housing means includes;

Pointing means mounted to said gear housing means and extending radially therefrom, said pointers being disposed external to said main housing means.

14. The device of claim 13 wherein said main housing means includes:

a plurality of detents disposed on said main housing means for engaging said pointing means.

15. The device of claim 14 wherein said first bearing means includes:

needle bearings.

16. The device of claim 11 wherein:

said worm comprises an hourglass-type of enveloping worm; and said worm gear includes a standard involute spur gear teeth.

17. The device of claim 11 wherein:

said worm, said worm gear and said hinged gear are all mounted to said main housing means in generally the same plane.

18. The device of claim 5 wherein said at least one input means includes:

two oppositely disposed input means terminating exterior of said main housing means.

19. The device of claim 5 wherein:
said second gear means includes a second bearing means.

20. The device of claim 1 wherein:
said reaction means includes a reaction tool having a jaw and a handle portion; and
said main housing means includes a tubular recess, said tubular recess including a release mechanism for releasably mounting said reaction tool.

21. The device of claim 20 wherein said handle portion includes:
at least one second slot.

22. The device of claim 21 wherein said release mechanism includes:
a lever having a toe portion and being rotatably mounted to said main housing means; and
an L-shaped spring for urging said lever outwardly of said main housing means.

23. The device of claim 22 wherein:
said toe portion engages a surface of said at least one second slot of said reaction tool.

24. The device of claim 20 wherein:
said jaw is formed in a generally C-shape.

25. The device of claim 21 wherein said at least one second slot includes:
two second slots.

26. The device of claim 1 wherein said hinged gear includes:
a first portion and a second portion.

27. The device of claim 26 wherein:
said first portion has a first male end;
said second portion has a first female end; and
said hinge means includes a hinge pin rotatably interconnecting said first male end with said first female end.

28. The device of claim 27 wherein:
said first male end includes teeth; and
said first female end includes a taper.

29. The device of claim 28 wherein:
said first portion has a second male end;
said second portion has a second female end; and
said main housing means includes a pair of opposed release pins for locking and unlocking said second male end from said second female end.

30. The device of claim 29 wherein each of said release pins includes:
an actuator;
a central rod extending from said actuator;
a spring for urging said actuator outwardly of said main housing means; and
a head disposed on an end of said central rod.

31. The device of claim 30 wherein said second male end includes:
a pair of laterally spaced cavities, said cavities disposed on opposite sides of said second male end, said cavities each having a longitudinal direction which is generally parallel with each other and generally transverse to a radial direction of said hinged gear;
a pair of pistons disposed within said cavities;
a first pair of springs also disposed within said cavities for urging said pistons outwardly of said cavities;
a slide slidably disposed on said second male end and adapted for moving between a first position and a second position on said second male end, said slide including a pair of apertures for receiving therethrough said pair of pistons; and
a second pair of springs adapted for urging said slide outwardly from said second male end.

32. The device of claim 31 wherein said second female end includes:
a pair of cylinders for receiving said pair of pistons; and
a pair of apertures for receiving said heads of said release pins.

33. The device of claim 32 wherein said second portion of said hinged gear includes:
a pair of dimples.

34. The device of claim 33 wherein:
said first portion and said second portion of said hinged gear are each approximately equal in a radial dimension.

35. The device of claim 34 wherein said output means includes:
a socket.

36. The device of claim 1 including:
a circuit means for turning "on" said display in response to a torque measured by said torque measuring means.

37. The device of claim 36 wherein said circuit means includes:
comparator means for receiving a signal from said strain gauge; and
transistor means for receiving a signal from said comparator means and turning "on" said display.

38. The device of claim 36 wherein said circuit means includes:
a pair of comparators, each of said comparators connected in circuit with said strain gauge;
gate means connected in circuit with said comparators; and
transistor means for energizing said display in response to a signal from said gate means.

39. A torque tool comprising:
housing means;
gear train means mounted to said housing means, said gear train means having at least one input means and at least one output means;
a reaction tool having a jaw and a handle portion with at least one slot and means for releasably mounting said reaction tool to said housing by means of a release mechanism whereby the reaction to the application of force to an input is reacted through the reaction tool and, thus an object to which torque is applied is protected from said reaction.

40. The device of claim 39 wherein said release mechanism includes:
a lever having a toe portion and being rotatably mounted to said housing means; and
an L-shaped spring for urging said lever outwardly of said housing means.

41. The device of claim 40 wherein:
said toe portion engages a surface of said at least one second slot of said reaction tool.

42. The device of claim 39 wherein:
said jaw is formed in a generally C-shape.

43. The device of claim 39 wherein said at least one second slot includes:
two second slots.

* * * * *